(12) United States Patent
Tsujita

(10) Patent No.: US 10,244,137 B2
(45) Date of Patent: Mar. 26, 2019

(54) IMAGE PROCESSING APPARATUS, INFORMATION PROCESSING METHOD, AND STORAGE MEDIUM FOR EXTRACTING ONE OR MORE SETTINGS FROM A RECEIVED PRINT JOB IN A CASE WHERE POST-PROCESSING CANNOT BE PERFORMED

(71) Applicant: CANON KABUSHIKI KAISHA, Tokyo (JP)

(72) Inventor: Kosuke Tsujita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/237,456

(22) Filed: Aug. 15, 2016

(65) Prior Publication Data
US 2017/0064117 A1 Mar. 2, 2017

(30) Foreign Application Priority Data
Aug. 24, 2015 (JP) ................................. 2015-165057

(51) Int. Cl.
H04N 1/00 (2006.01)
G06F 3/12 (2006.01)
G06K 15/02 (2006.01)

(52) U.S. Cl.
CPC ........ *H04N 1/00925* (2013.01); *G06F 3/1205* (2013.01); *G06F 3/1255* (2013.01); *G06F 3/1258* (2013.01); *G06F 3/1285* (2013.01); *G06K 15/1809* (2013.01); *G06F 3/1264* (2013.01); *H04N 2201/0094* (2013.01)

(58) Field of Classification Search
CPC .............. G06K 15/403; G06K 15/404; G06K 15/1809; G06F 3/1258; G06F 3/1264; G06F 3/1255
See application file for complete search history.

(56) References Cited

U.S. PATENT DOCUMENTS

| | | | | |
|---|---|---|---|---|
| 2011/0063657 A1* | 3/2011 | Okada | ................ | G03G 15/5012 358/1.15 |
| 2012/0287463 A1* | 11/2012 | Iida | ........................ | G06F 3/1205 358/1.15 |
| 2014/0268206 A1* | 9/2014 | Tokuoka | ................ | G06F 3/1219 358/1.14 |

FOREIGN PATENT DOCUMENTS

JP         2005017692 A         1/2005

* cited by examiner

*Primary Examiner* — Benjamin O Dulaney
(74) *Attorney, Agent, or Firm* — Canon U.S.A., Inc. I.P. Division

(57) ABSTRACT

An image processing apparatus includes a receiving unit that receives a print job, a determination unit that determines whether post-processing can be performed, and a control unit that, if the determination unit determines that post-processing cannot be performed, performs processing in accordance with setting information, extracted from the print job, on an operation for a case where the post-processing cannot be performed.

9 Claims, 11 Drawing Sheets

FIG. 4A

| TYPE OF POST-PROCESSING | PRINTING OPERATION FOR CASE WHERE POST-PROCESSING IS DISABLED |
|---|---|
| STAPLE (CORNER/DOUBLE) | CANCEL PRINT JOB |
| STAPLE (STAPLELESS BINDING) | CANCEL POST-PROCESSING AND PERFORM PRINTING |
| STAPLE (SADDLE STITCHING) BOOKBINDING (FOLDING+SADDLE STITCHING) | CANCEL POST-PROCESSING AND PERFORM PRINTING |

FIG. 4B

| TYPE OF POST-PROCESSING | MAXIMUM NUMBER OF SHEETS OF PAPER THAT CAN BE SUBJECTED TO POST-PROCESSING |
|---|---|
| STAPLE (CORNER/DOUBLE) | 50 |
| STAPLE (STAPLELESS BINDING) | 5 |
| STAPLE (SADDLE STITCHING) BOOKBINDING (FOLDING+SADDLE STITCHING) | 30 |

FIG. 7

| TYPE OF POST-PROCESSING | WHETHER TO SET DECIDED PRINTING OPERATION IN IMAGE PROCESSING APPARATUS WHEN POST-PROCESSING IS DISABLED |
|---|---|
| STAPLE (CORNER/DOUBLE) | SET |
| STAPLE (STAPLELESS BINDING) | NOT SET |
| STAPLE (SADDLE STITCHING) BOOKBINDING (FOLDING + SADDLE STITCHING) | SET |

FIG. 8

Specify whether to set a decided printing operation in the image processing apparatus when it is determined that post-processing is disabled.

Staple (Corner/Double) ● Set ○ Not Set

Staple (Stapleless Binding) ○ Set ● Not Set

Staple (Saddle Stitching) Bookbinding (Folding + Saddle Stitching) ○ Set ● Not Set

[ OK ]  [ Cancel ]

IMAGE PROCESSING APPARATUS, INFORMATION PROCESSING METHOD, AND STORAGE MEDIUM FOR EXTRACTING ONE OR MORE SETTINGS FROM A RECEIVED PRINT JOB IN A CASE WHERE POST-PROCESSING CANNOT BE PERFORMED

BACKGROUND

Field

Aspects of the present invention generally relate to an image processing apparatus, an information processing apparatus, an information processing method, and a storage medium.

Description of the Related Art

In related art, there are multi-function printers compatible with a finisher capable of various types of finishing, such as stapling and hole punching. In some types of finishing, however, the case arises where a finishing cannot be applied to printed sheets of paper. For example, with respect to stapling, since the number of sheets of paper that can be bound is restricted, if the number of sheets to be stapled exceeds a pre-set limit, measures are taken, such as cancellation of a print job or output of sheets of paper without stapling (see Japanese Patent Laid-Open No. 2005-17692).

With respect to a printing operation for the case where post-processing, such as stapling, cannot be performed on printed sheets of paper, operation of an operation unit of an image processing apparatus enables a setting to be checked and changed. In an office environment, a user performing post-processing checks the value set in the image processing apparatus and can check a printing operation for the case where processing, such as stapling, cannot be performed.

However, the fact that such an act of checking is carried out whenever printing is performed is troublesome to the user and is work that imposes a burden on the user. For this reason, in inputting a print job containing stapling processing to the image processing apparatus, most users input the print job without checking a printing operation set in the image processing apparatus. At this time, as for a printing operation for the case where post-processing cannot be performed, if a user's understanding is different from a value set in the image processing apparatus, a user's unintended printing is performed.

SUMMARY OF THE INVENTION

An image processing apparatus according to an aspect of the present invention includes a receiving unit configured to receive a print job, a determination unit configured to determine whether post-processing can be performed, and a control unit configured to, if the determination unit determines that post-processing cannot be performed, perform processing in accordance with setting information, extracted from the print job, on an operation for a case where the post-processing cannot be performed.

Further features of aspects of the present invention will become apparent from the following description of exemplary embodiments with reference to the attached drawings.

BRIEF DESCRIPTION OF THE DRAWINGS

FIGS. 4A and 4B each illustrate a table (first).

FIG. 7 illustrates a table (second).

FIG. 8 illustrates a screen on which it is specified whether a decided printing operation is set in the image processing apparatus when post-processing is disabled.

DESCRIPTION OF THE EMBODIMENTS

Embodiments of the present invention will be described below with reference to the drawings.

First Embodiment

Figure 1:
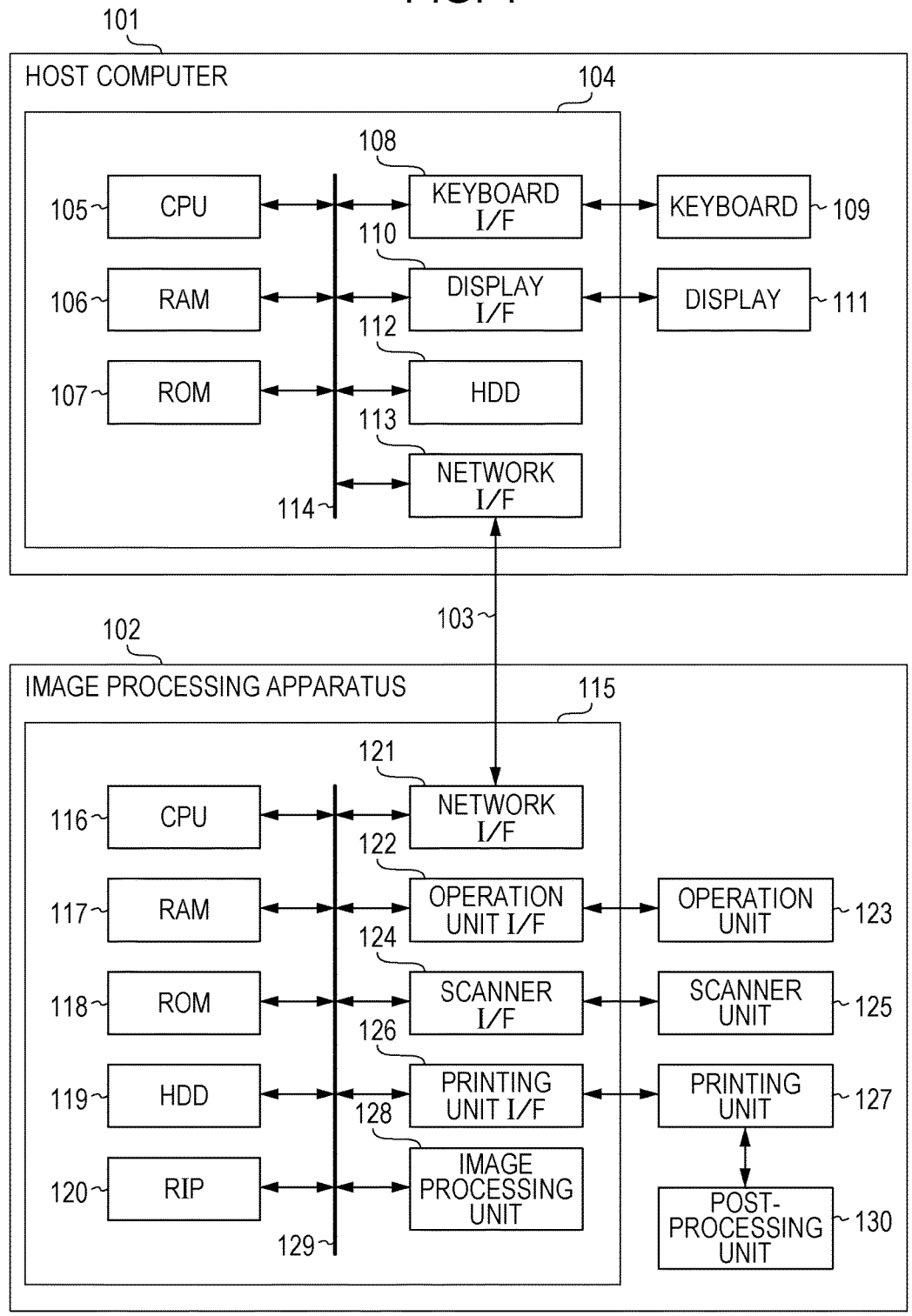
FIG. 1 illustrates hardware configurations of an image processing apparatus and a host computer.

FIG. 1 illustrates examples of hardware configurations of an image processing apparatus and a host computer. A host computer 101 and an image processing apparatus 102 are connected to each other via a network 103.

The host computer 101 includes a controller unit 104, a keyboard 109, and a display 111. A central processing unit (CPU) 105 executes document processing on documents containing graphics, images, characters, tables (including spreadsheets), and others in accordance with a document processing program or the like stored in a read only memory (ROM) 107 or a hard disk drive (HDD) 112. The CPU 105 performs centralized control of devices connected to a system bus 114. The ROM 107 or the HDD 112 also stores an operating system (OS) program or the like which is a control program of the CPU 105. The ROM 107 or the HDD 112 stores font data or the like used in the above-described document processing and stores various types of data used when the above-described document processing or the like is performed.

A random access memory (RAM) 106 functions as a main memory, a work area, or the like of the CPU 105. A keyboard interface (I/F) 108 controls key inputs from the keyboard 109 and a pointing device connected thereto, for example. A display I/F 110 controls displays provided by the display 111 connected thereto. A user can set print settings in and provide a print instruction to the image processing apparatus 102 via a display provided by the display 111 and an input from the keyboard 109.

In the case where printing is performed in the image processing apparatus 102, a print job is output from a network I/F 113 via the network 103. The print job is composed of print settings, such as double-sided printing and finishing, and image data represented in a page description language (PDL) or the like. The CPU 105 executes processing in accordance with a program stored in the ROM 107, the HDD 112, or the like, and thus a software configuration of the host computer 101 illustrated in FIG. 2 to be described and so forth are implemented.

The image processing apparatus 102 includes an image controller unit 115, an operation unit 123, a scanner unit 125, a printing unit 127, and a post-processing unit 130. A CPU 116 performs centralized control of devices connected to a system bus 129 and thus controls copying and printing from the host computer 101. A ROM 118 stores various parameters and programs used for running the image processing apparatus 102. A RAM 117 functions as a main memory, a work area, or the like of the CPU 116 and is also used as a buffer region for image data for scanning, printing, or the like. An HDD 119 temporarily stores print data received by a network I/F 121 and is accessed by each module as a swap area for a raster image processor (RIP) 120 or an image processing unit 128. The RIP 120 converts a PDL into raster image data.

An operation unit I/F 122 is a communication I/F for controlling a key input from the operation unit 123 connected thereto and a display output to the operation unit 123. The operation unit 123 is composed of hard keys and a touch panel and enables state display and operation of the image processing apparatus 102. A scanner I/F 124 is a communication I/F for controlling the scanner unit 125 connected thereto and performs transmission and reception of control commands for the scanner unit 125 and reception of images optically scanned by the scanner unit 125. The scanner unit 125 optically scans a document.

A printing unit I/F 126 is a communication I/F for controlling the printing unit 127 connected thereto and the post-processing unit 130 and performs transmission and reception of control commands for the printing unit 127 and the post-processing unit 130 and transmission of images to be printed by the printing unit 127. The post-processing unit 130 performs post-processing, such as stapling, hole punching, saddle stitching, etc., on sheets of paper printed and discharged by the printing unit 127.

The image processing unit 128 performs image processing, such as scaling, rotation, color conversion, smoothing, etc., on images scanned by the scanner unit 125 and images generated by the RIP 120. The CPU 116 executes processing in accordance with a program stored in the ROM 118, the HDD 119, or the like, and thus a software configuration of the image processing apparatus 102 illustrated in FIG. 2 and processes represented by flowcharts illustrated in FIGS. 9 and 11, which will be described, are implemented.

Figure 2:
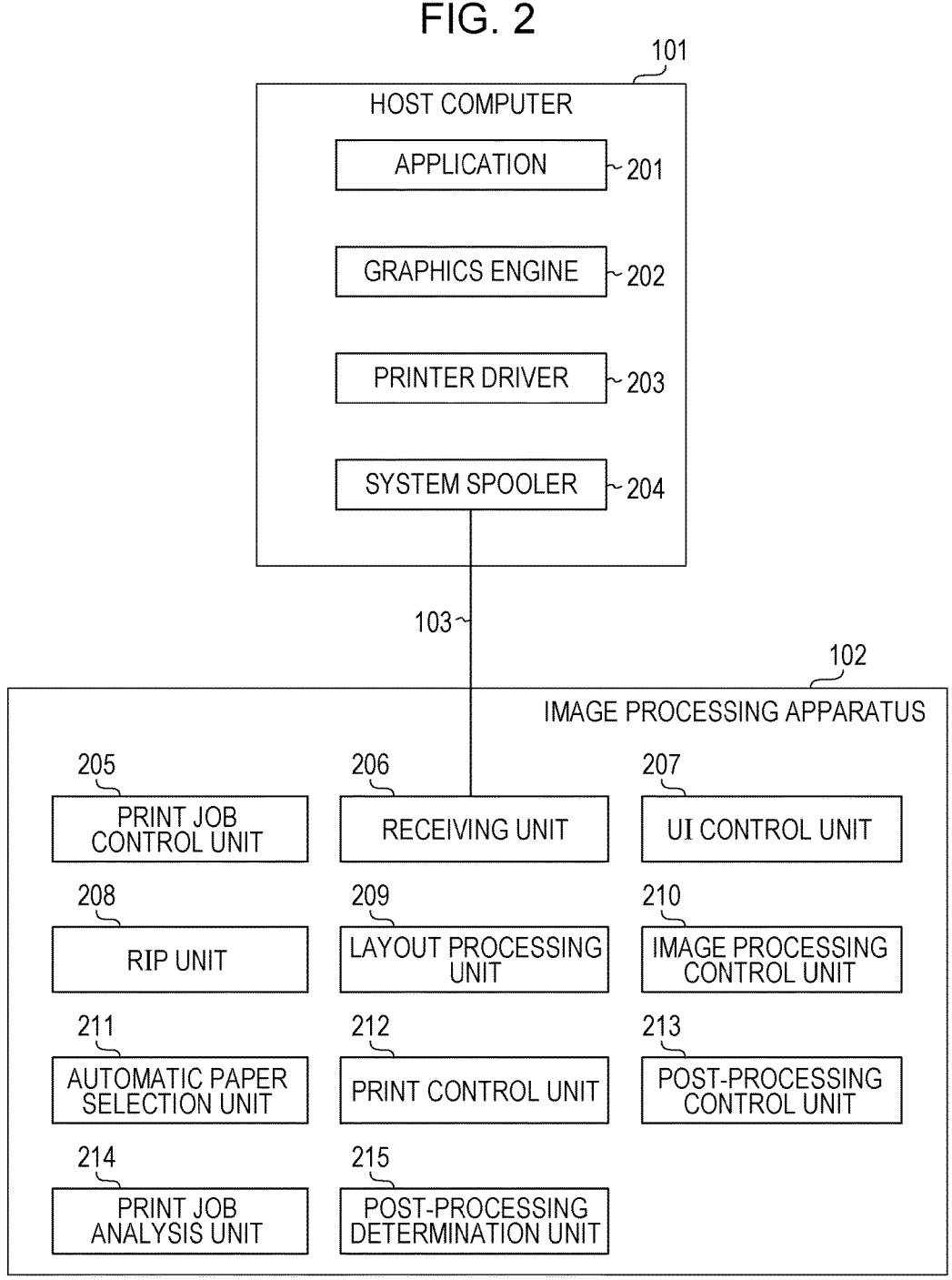
FIG. 2 illustrates software configurations of the image processing apparatus and the host computer.

FIG. 2 illustrates examples of software configurations of the image processing apparatus and the host computer in print processing.

The host computer 101 includes, as software components, an application 201, a graphics engine 202, a printer driver 203, and a system spooler 204. When the application 201 causes the image processing apparatus 102 to perform printing, the graphics engine 202 is used to perform outputting (rendering). The graphics engine 202 generates a print job based on an output of the application 201 using the printer driver 203 prepared for each image processing apparatus.

A print job is composed of print settings and PDL data. The print settings are, for example, a double-sided printing setting and a finishing setting, such as stapling. The printer driver 203 sets settings of page order, a layout of each page, a combination of a plurality of pages, and post-processing in accordance with print settings. The print job generated by the printer driver 203 is output through the system spooler 204 to the image processing apparatus 102 via the network I/F 113.

The image processing apparatus 102 includes, as software components, a print job control unit 205, a receiving unit 206, a user interface (UI) control unit 207, a RIP unit 208, a layout processing unit 209, an image processing control unit 210, an automatic paper selection unit 211, and a print control unit 212. The image processing apparatus 102 further includes, as software components, a post-processing control unit 213, a print job analysis unit 214, and a post-processing determination unit 215.

The print job control unit 205 manages a print job received by the receiving unit 206 via the network I/F 121 and performs printing using the respective modules denoted by reference numerals 207 to 215. The UI control unit 207 provides a display of job conditions or the like of a print job on the operation unit 123. The UI control unit 207 also provides a display of prompting user intervention, such as dealing with paper out, paper jam, etc. The UI control unit 207 further receives settings regarding printing input from the user to the operation unit 123 when the user performs copying.

The print job analysis unit 214 extracts a print setting and PDL data from a print job. The RIP unit 208 converts a PDL into raster image data by using the RIP 120. The layout processing unit 209 decides on how images are laid out on paper in accordance with print settings. Examples of processing performed by the layout processing unit 209 include, but are not limited to, deciding on a normal image and a reverse image for a back side in accordance with a double-sided printing setting, deciding on image orientation so that stapling can be performed at a specified stapling position, and centering an image if paper does not match the image in size. The image processing control unit 210 performs image processing, such as scaling, rotation, color conversion, and smoothing, using the image processing unit 128.

The automatic paper selection unit 211 automatically selects, in accordance with a specified paper size or image size, a paper feed cassette in which optimum sheets of paper are loaded from among a manual feed cassette 318 and paper cassettes 317. The print control unit 212 controls the printing unit 127 to perform printing. The post-processing determination unit 215 determines whether post-processing is enabled in accordance with a print setting and PDL data. The post-processing control unit 213 controls the post-processing unit 130 to perform finishing processing specified in the print setting.

Figure 3:
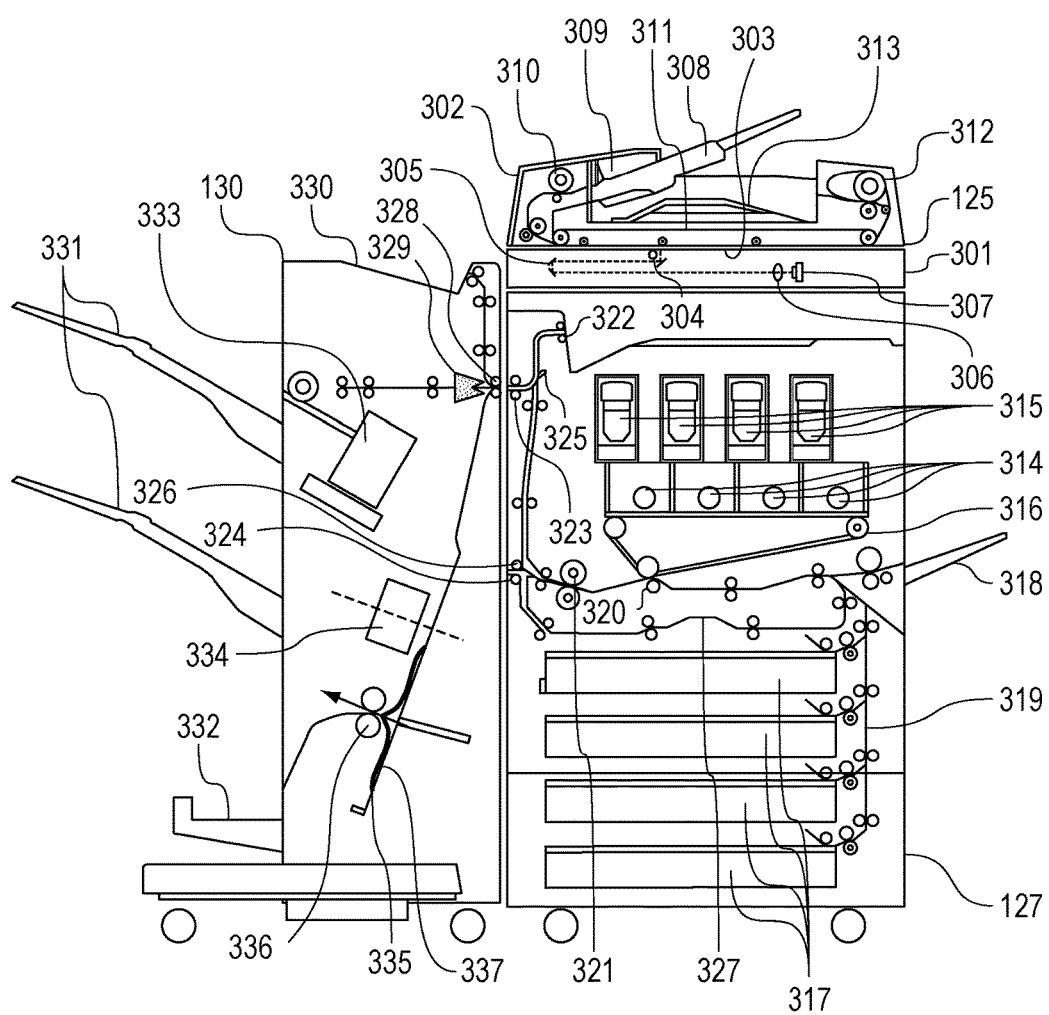
FIG. 3 is a cross-sectional view of the image processing apparatus.

FIG. 3 is a cross-sectional view of the image processing apparatus 102. The image processing apparatus 102 includes the scanner unit 125, the printing unit 127, and the post-processing unit 130.

The scanner unit 125 includes a scanner 301 and a document feeder (DF) 302 and is used for optically scanning a document. In the case where a platen is used to scan a document, a document is set on a platen 303 and the DF 302 is closed. When scanning is started, the document is illuminated by a light source 304, and an image is scanned by a charge coupled device (CCD) 307 via a reflection plate 305 and a lens 306, converted into a digital signal, subjected to intended image processing, and then converted into print image data. The converted print image data is stored in the HDD 119.

In the case where the DF 302 is used to scan a document, a document is placed on a tray of a document setting unit 308 of the DF 302. When scanning is started, a document sensor 309 detects that the document has been set. In response to the detection, a document feed roller 310 and a conveying belt 311 rotate to convey the document and the document is set in a certain position on the platen 303. An image is then scanned as in the scanning performed on the platen 303, and stored in the HDD 119.

When scanning completes, the conveying belt 311 rotates again to convey the document and discharges it onto a document discharge tray 313 via a conveying roller 312 provided on a discharge side. In a case where a plurality of documents exists, while a document is conveyed to be discharged from the platen 303, simultaneously, a subsequent document is fed via the document feed roller 310 and continuously scanned.

The printing unit 127 is used for printing the print image data stored in the HDD 119. The print image data is converted into recording laser beams for four colors: yellow, magenta, cyan, and black. Photosensitive members 314 for the respective colors are irradiated with the respective recording laser beams to form electrostatic latent images thereon. Then, toner development is performed using toner supplied from each of toner cartridges 315, and primary transfer of visualized images is performed onto an intermediate transfer belt 316. The intermediate transfer belt 316 rotates clockwise.

When recording paper fed from a paper cassette 317 or the manual feed cassette 318 through a fed paper conveying path 319 reaches a secondary transfer position 320, the images are transferred from the intermediate transfer belt 316 to the recording paper. Toner on the recording paper onto which the images have been transferred is fixed by a fixing unit 321 applying pressure and heat thereto, and the recording paper is conveyed through a discharge conveying path. Subsequently, the recording paper is discharged to a center tray discharge port 322, or alternatively, is switched back and discharged to a discharge port 323 to the post-processing unit 130, or to a side tray discharge port 324. The side tray discharge port 324 is a discharge port through which paper can be discharged only in the case where the post-processing unit 130 is not attached thereto.

Flappers 325 and 326 are used for switching between conveying paths to switch between the discharge ports. In the case of double-sided printing, the flapper 326 switches between the conveying paths after recording paper passes through the fixing unit 321, and the recording paper is thereby switched back to be conveyed downward and fed again to the secondary transfer position 320 through a double-sided printing paper conveying path 327.

The post-processing unit 130 is used for applying post-processing to printed sheets of paper in accordance with a function specified by the user. Printed paper conveyed from the discharge port 323 to the post-processing unit 130 is fed from a post-processing unit paper feed port 328. A conveying path through which the paper fed from the post-processing unit paper feed port 328 is conveyed is switched to a conveying path for any of a discharge destination 330, discharge destinations 331, and a discharge destination 332 by a flapper 329.

In the case of discharge to the discharge destination 330, paper is directly discharged because there is no special post-processing applied to the paper. In the case of output to a discharge destination 331, stapling processing using a stapler 333, shift processing to shift sheets of paper to the back/front of the apparatus, or other processing is performed in accordance with settings. In the case of output to the discharge destination 332, the sheets of paper are contained in a containing portion 335 having a stacking surface 337. A stapler 334 binds the sheets of paper on the containing portion 335 and a folding roller 336 folds the sheets of paper.

(Printing Operation Settings for Cases where Post-Processing is Disabled in the Image Processing Apparatus)

A method of setting a printing operation setting for the case where post-processing is disabled that is to be stored in the image processing apparatus 102 will now be described.

FIG. 4A is a table storing printing operation settings for cases where post-processing is disabled in the image processing apparatus 102. A table 401 is stored in the RAM 117 and stores, for each type of post-processing, a printing operation for the case where post-processing cannot be performed because the number of sheets of printing paper exceeds its limit.

For example, staple (e.g., corner/double), which is one type of post-processing as denoted by reference numeral 402, refers to post-processing where stapling is performed at one or two of four corners of a paper. When the post-processing is set in a print job, if the post-processing cannot be performed because the number of sheets of printing paper exceeds its limit, the image processing apparatus 102 performs a printing operation of cancelling the print job, which is a value stored in 403. Thus, the table stores as a value, for each type of post-processing, a printing operation for the case where the post-processing cannot be performed because the number of sheets of printing paper exceeds its limit.

FIG. 4B is a table storing maximum numbers of sheets of paper that can be subjected to post-processing. A table 404 is stored in the RAM 117 and stores, for each type of post-processing, a maximum number of sheets of paper that can be subjected to post-processing. For example, staple (e.g., corner/double), which is one type of post-processing, denoted by reference numeral 405 can be performed on a stack of a maximum of 50 sheets of paper, which is stored in 406 as the maximum value.

Figure 5:
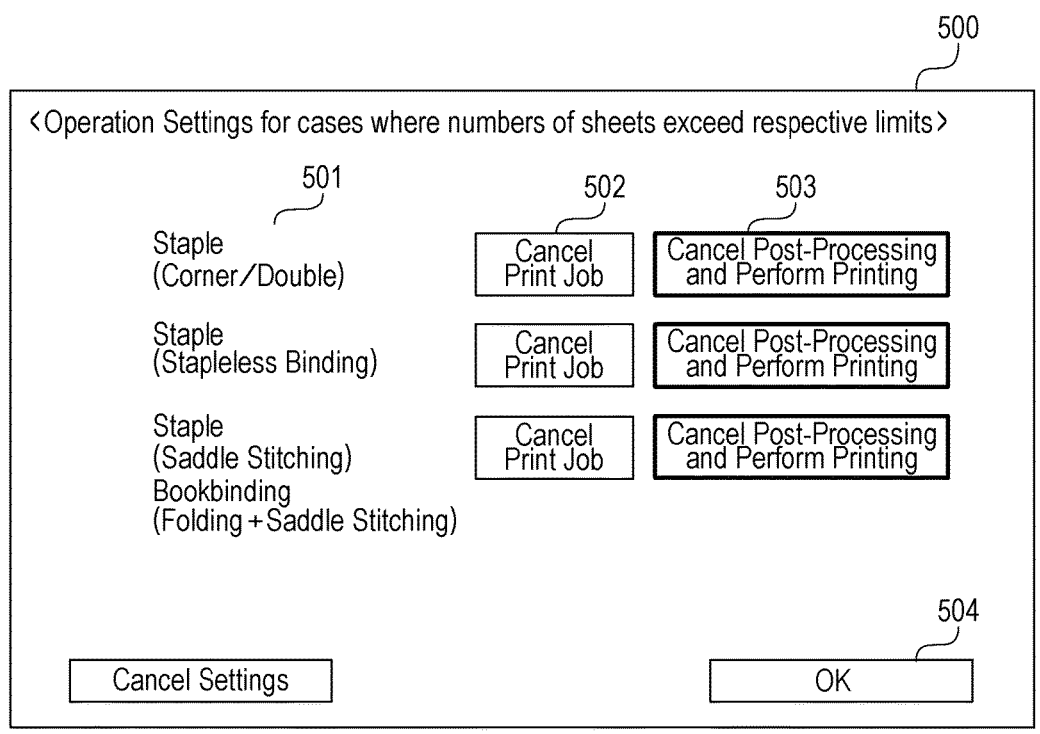
FIG. 5 illustrates an example of a screen on which printing operation settings for cases where post-processing is disabled are set.

FIG. 5 illustrates an example of a screen on which printing operation settings for cases where post-processing is disabled are set in the image processing apparatus 102. The CPU 116 acquires a screen 500 on which printing operation settings for cases where post-processing is disabled are set from the RAM 117 and instructs the UI control unit 207 to display it on the operation unit 123. An item 501 refers to an item for, when post-processing where stapling is performed at one or two of four corners of a paper is set in a print job, setting a printing operation for the case where the post-processing cannot be performed because the number of sheets of printing paper exceeds its limit.

A button 502 is used for setting a setting at which, if the post-processing cannot be performed, the print job is canceled. A button 503 is used for setting a setting at which, if the post-processing cannot be performed, printing is performed without stapling processing being performed. For example, when the user operates the operation unit 123 to press the button 502 and press an OK button 504, the CPU 116 instructs the UI control unit 207 to record a setting "cancel print job", which is information of the pressed button, into 403 of the table 401 stored in the RAM 117.

(Method of Specifying a Printing Operation for the Case where Post-Processing is Disabled from the Printer Driver)

A method of specifying a printing operation for the case where post-processing is disabled in a print job to be input to the image processing apparatus 102 will now be described.

Figure 6A:
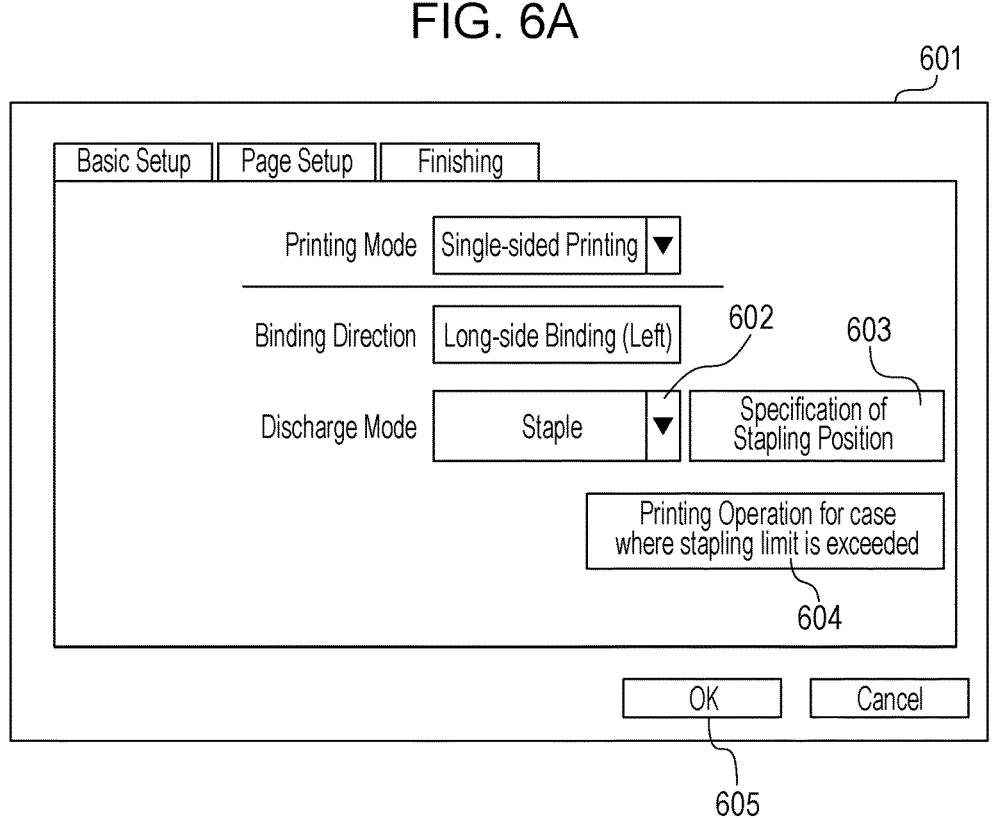
FIGS. 6A and 6B each illustrate a screen of a printer driver on which print settings of a print job are set.
Figure 6B:
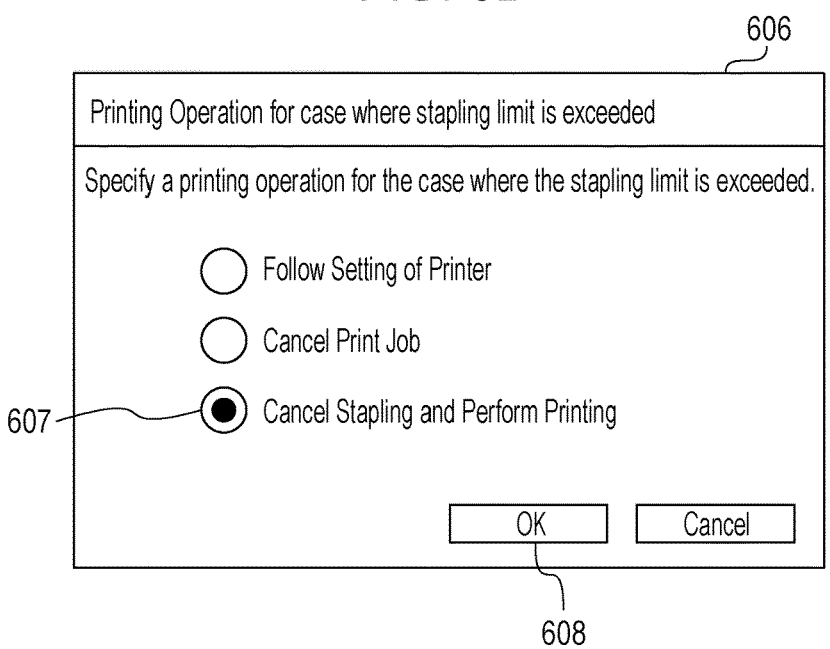

FIGS. 6A and 6B each illustrate an example of a screen of the printer driver on which print settings of a print job are set. When the application 201 running on the host computer 101 causes the image processing apparatus 102 to perform printing, the CPU 105 acquires a screen 601 from the RAM 106 and causes the display 111 to display it. For example, when the user wants to set stapling processing in a print job, the user selects 602 to set "Staple" for "Discharge Mode"

and also operates 603 to specify "Corner (Top Left)" for "Specification of Stapling Position". Thus, stapling processing can be specified as post-processing in the print job.

When the user presses a button 604, the CPU 105 acquires a screen 606 from the RAM 106 and causes the display 111 to display it. The screen 606 is a screen on which a printing operation for the case where stapling processing cannot be performed because the number of sheets of printing paper exceeds its limit is specified. The user selects 607 and presses an OK button 608.

Next, as an operation for the case where stapling processing cannot be performed because the number of sheets of printing paper exceeds its limit, the CPU 105 writes, into the RAM 106, setting information of a setting "cancel stapling and perform printing". Subsequently, the CPU 105 acquires the screen 601 from the RAM 106 and causes the display 111 to display it. Then, when the user presses an OK button 605, the CPU 105 incorporates the setting information of the print settings stored in the RAM 106 into the print job and transmits the print job to the image processing apparatus 102.

(Method of Setting Whether a Print Setting is Updated when Post-Processing is Disabled in the Image Processing Apparatus)

A method of specifying whether a printing operation performed when it is determined that post-processing is disabled in the image processing apparatus 102 is set in the image processing apparatus 102 will now be described.

FIG. 7 is a table storing information whether a printing operation, performed when it is determined that post-processing is disabled in the image processing apparatus 102, is to be set in the image processing apparatus 102. A table 701 is stored in the RAM 117 and stores, for each type of post-processing, information whether a decided printing operation is to be set in the image processing apparatus 102 when it is determined that post-processing is disabled in the image processing apparatus 102. For example, for staple (e.g., corner/double) denoted by 702, if this post-processing cannot be performed because the number of sheets of printing paper exceeds its limit, a decided printing operation is set in the table 401.

FIG. 8 illustrates an example of a screen on which it is specified whether a decided printing operation is set in the image processing apparatus when post-processing is disabled. The CPU 116 acquires a screen 801 from the RAM 117 and instructs the UI control unit 207 to display it on the operation unit 123. An item 802 is an item for, if staple (e.g., corner/double), which is one type of post-processing, cannot be performed because the number of sheets of printing paper exceeds its limit, specifying whether to set a decided printing operation in 403 of the table 401. For example, when the user operates the operation unit 123 to press a radio button 803 and press an OK button 804, the CPU 116 instructs the UI control unit 207 to record "set" into 703 of the table 701 stored in the RAM 117.

(Print Processing Performed by the Image Processing Apparatus when a Print Job is Received)

Figure 9:
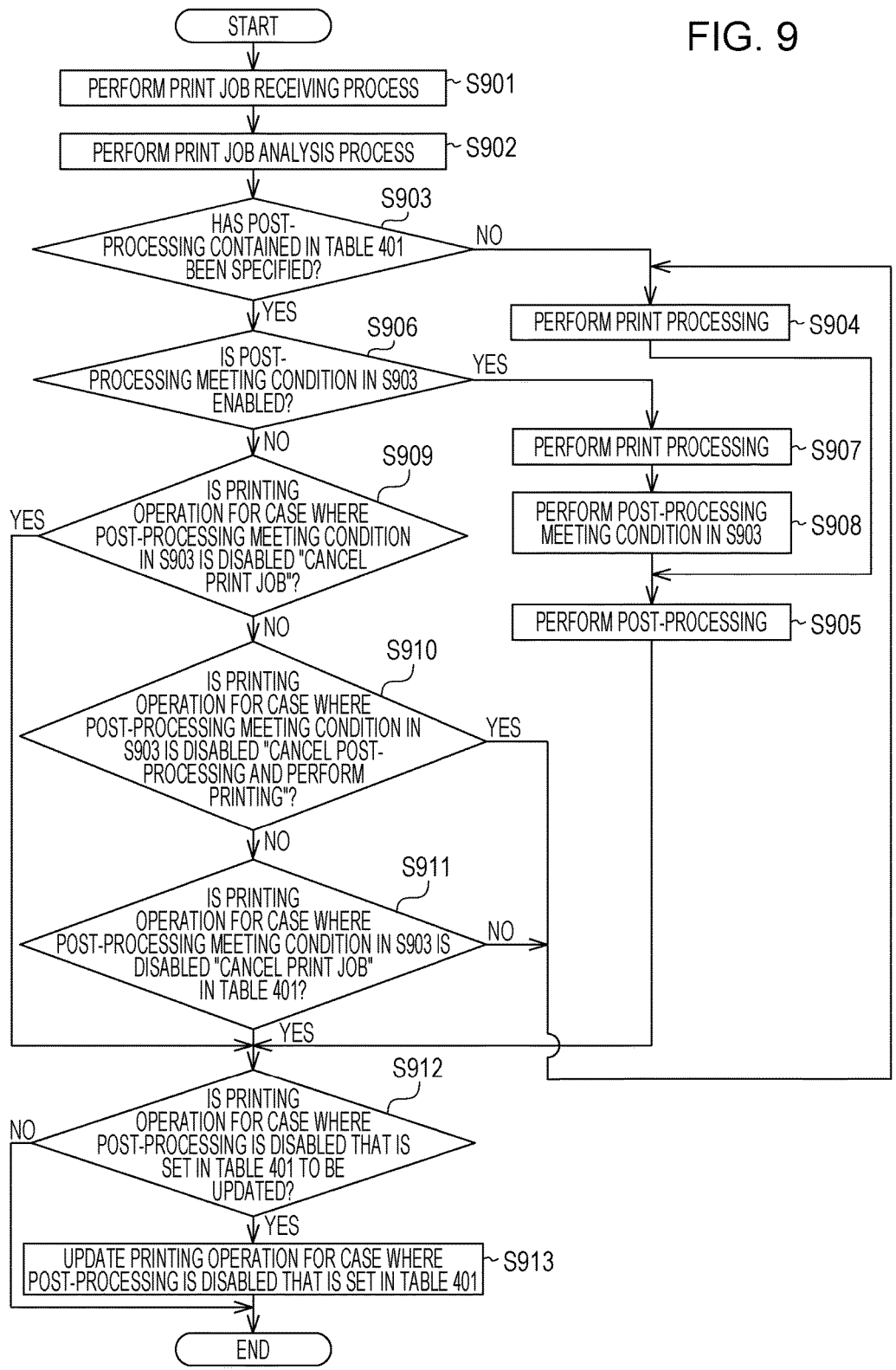
FIG. 9 is a flowchart illustrating an example of information processing performed by the image processing apparatus according to a first embodiment.

FIG. 9 is a flowchart illustrating an example of information processing performed by the image processing apparatus 102.

When a print job from the host computer 101 is received, the CPU 116 stores the print job in the RAM 117 in S901. Subsequently, the CPU 116 causes the process to proceed to S902. In S902, the CPU 116 retrieves the print job from the RAM 117 and analyzes the print job to extract a print setting and PDL data from the print job. Then, the CPU 116 stores the extracted print setting and PDL data in the RAM 117 and causes the process to proceed to S903.

In S903, the CPU 116 accesses the RAM 117 to determine whether the extracted print setting is contained in types of post-processing in the table 401. If the extracted print setting is not contained in the types of post-processing in the table 401 (NO in S903), the CPU 116 causes the process to proceed to S904. In S904, the CPU 116 performs print processing. Subsequently, the CPU 116 causes the process to proceed to S905. In S905, the CPU 116 performs post-processing not contained in the table 401. Subsequently, the CPU 116 causes the process to proceed to S912.

In S903, if the extracted print setting is contained in the types of post-processing in the table 401 (YES in S903), the CPU 116 causes the process to proceed to S906. In S906, the CPU 116 determines whether post-processing meeting the condition in S903 is enabled. If the post-processing meeting the condition in S903 is enabled (YES in S906), the CPU 116 causes the process to proceed to S907.

In S907, the CPU 116 performs the same processing as that in S904. Subsequently, the CPU 116 causes the process to proceed to S908. In S908, the CPU 116 causes the post-processing meeting the condition in S903 to be performed on printed sheets of paper. Subsequently, the CPU 116 causes the process to proceed to S905.

In S906, if it is determined that the post-processing meeting the condition in S903 is not enabled (NO in S906), the CPU 116 causes the process to proceed to S909. In S909, the CPU 116 accesses the RAM 117 to check a printing operation setting for the case where the post-processing meeting the condition in S903 is disabled. If the printing operation setting for the case where the post-processing meeting the condition in S903 is disabled is "cancel print job" (YES in S909), the CPU 116 causes the process to proceed to S912.

In S909, if the printing operation setting for the case where the post-processing is disabled recorded in the print setting is not "cancel print job" (NO in S909), the CPU 116 causes the process to proceed to S910. In S910, the CPU 116 accesses the RAM 117 to check the printing operation setting for the case where the post-processing meeting the condition in S903 is disabled. If the printing operation setting for the case where the post-processing meeting the condition in S903 is disabled is "cancel post-processing and perform printing" (YES in S910), the CPU 116 causes the process to proceed to S904.

In S910, if the printing operation setting for the case where the post-processing is disabled that is recorded in the print setting is not "cancel post-processing and perform printing" (NO in S910), the CPU 116 causes the process to proceed to S911.

In S911, the CPU 116 accesses the table 401 stored in the RAM 117 to check a printing operation setting for the case where the post-processing meeting the condition in S903 is disabled. If the printing operation setting for the case where the post-processing meeting the condition in S903 is disabled is not "cancel print job" (NO in S911), the CPU 116 causes the process to proceed to S904.

In S911, if the printing operation setting for the case where the post-processing meeting the condition in S903 is disabled is "cancel print job" (YES in S911), the CPU 116 causes the process to proceed to S912.

In S912, the CPU 116 accesses the table 701 stored in the RAM 117 to check whether a printing operation for the case where the post-processing meeting the condition in S903 is disabled is to be updated. If a setting is set at which the printing operation for the case where the post-processing meeting the condition in S903 is disabled is not to be updated (NO in S912), the CPU 116 ends the process represented by the flowchart illustrated in FIG. 9. In S912, if a setting is set at which the printing operation for the case where the post-processing meeting the condition in S903 is disabled is to be updated (YES in S912), the CPU 116 causes the process to proceed to S913. In S913, the CPU 116 accesses the table 401 to update the printing operation setting for the case where the post-processing meeting the condition in S903 is disabled. Subsequently, the CPU 116 ends the process represented by the flowchart illustrated in FIG. 9.

In the process represented by the flowchart illustrated in FIG. 9, data of all pages in a print job is subjected to RIP processing in the image processing apparatus 102, and then it is determined whether post-processing is enabled. In another example, the CPU 116 starts printing of pages sequentially from a page whose data has been subjected to RIP processing in a print job and determines, during RIP processing, whether post-processing is enabled to perform a printing operation for the case where the post-processing is disabled that is contained in a print setting.

Second Embodiment

In a second embodiment, a process is described where, in a case where a user uses the image processing apparatus 102 to perform copying, when post-processing for which a printing operation for the case where the post-processing is disabled can be set is selected, printing operations for the case where the post-processing is disabled that are to be set in the image processing apparatus 102 are displayed and settings thereof are set. An image processing apparatus in the present embodiment is the same as that in the first embodiment.

(A Process in which, when Post-Processing for which a Printing Operation for the Case where the Post-Processing is Disabled can be Set is Selected in Print Setting Regarding Copying, Printing Operations are Displayed and Settings Thereof are Set)

Figure 10:
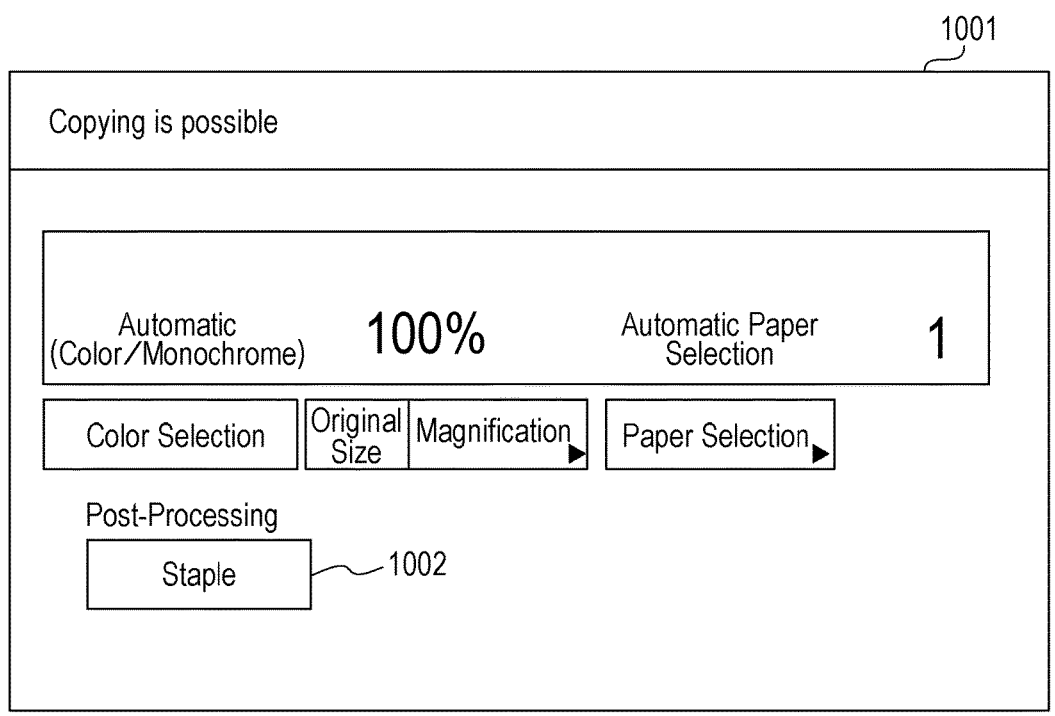
FIG. 10 illustrates an example of a screen on which print settings regarding copying are set.

FIG. 10 illustrates an example of a screen on which print settings regarding copying are set. The CPU 116 acquires a screen 1001 from the RAM 117 to display it on the operation unit 123. On the screen 1001, the user can set settings of color selection, magnification, type of paper to be used, the number of copies, etc. When the user presses a Staple button 1002 on the screen 1001 and sets, on a settings screen for stapling, a setting at which stapling is performed at a top left corner, copied sheets of printing paper can be stapled at the top left corner.

Figure 11:
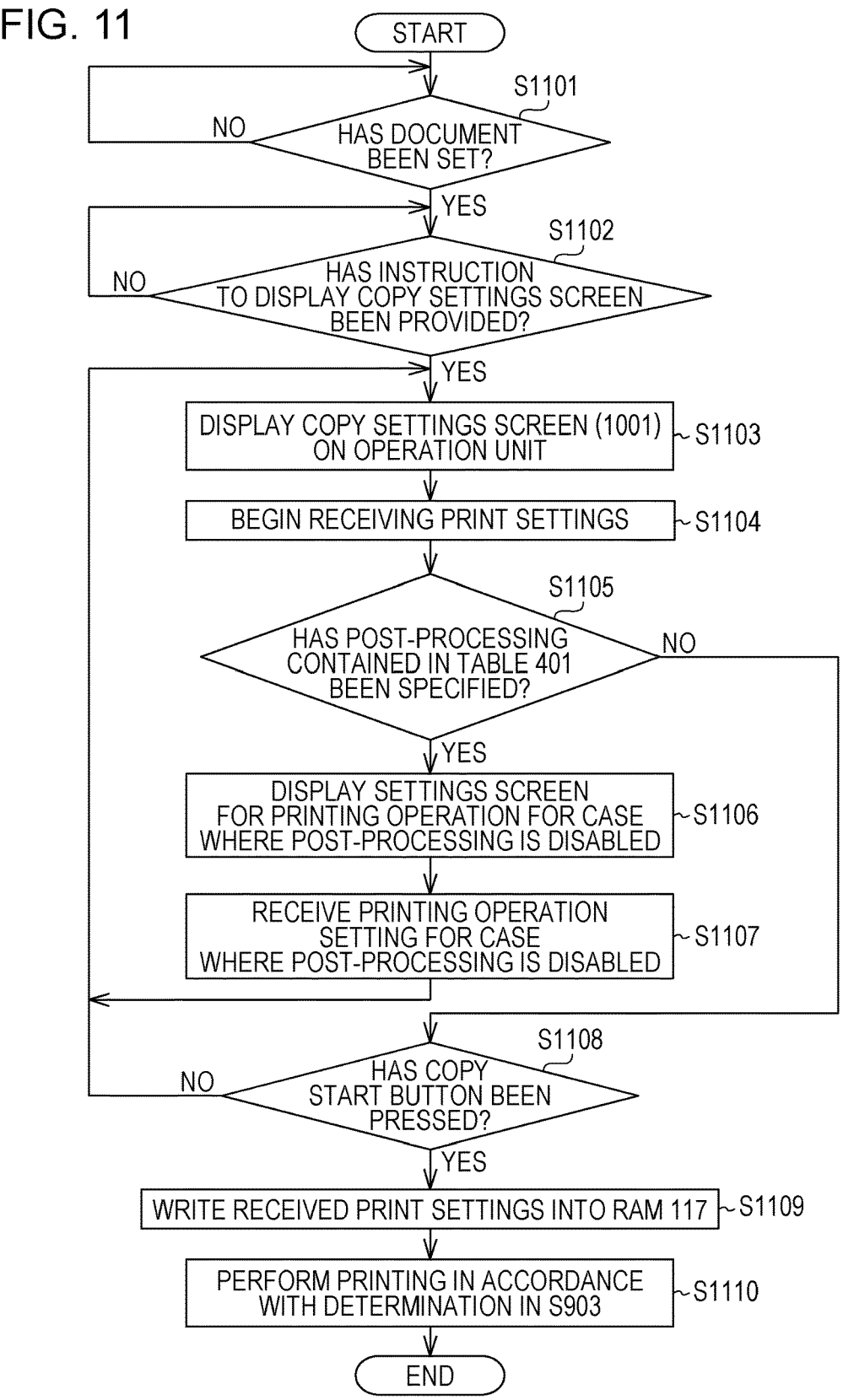
FIG. 11 is a flowchart illustrating an example of information processing performed by the image processing apparatus according to a second embodiment.

FIG. 11 is a flowchart illustrating an example of information processing performed by the image processing apparatus 102.

When the user sets a document on the document setting unit 308, the CPU 116 detects the set document in S1101 and causes the process to proceed to S1102. When the user operates the operation unit 123 to provide an instruction to display the screen 1001 for copy settings, the CPU 116 detects the instruction in S1102 and causes the process to proceed to S1103.

In S1103, the CPU 116 acquires the screen 1001 for copy settings from the RAM 117 and causes the operation unit 123 to display it. Subsequently, the CPU 116 causes the process to proceed to S1104. In S1104, the CPU 116 begins receiving print settings from the user. Here, print settings specified by the user operating the screen 1001 displayed on the operation unit 123 are stored in the RAM 117. After the CPU 116 begins receiving print settings from the user, the CPU 116 causes the process to proceed to S1105.

In S1105, the CPU 116 accesses the RAM 117 to check whether post-processing contained in the table 401 has been specified. If post-processing contained in the table 401 has not been specified (NO in S1105), the CPU 116 causes the process to proceed to S1108. In S1105, if post-processing contained in the table 401 has been specified (YES in S1105), the CPU 116 causes the process to proceed to S1106.

Figure 12:
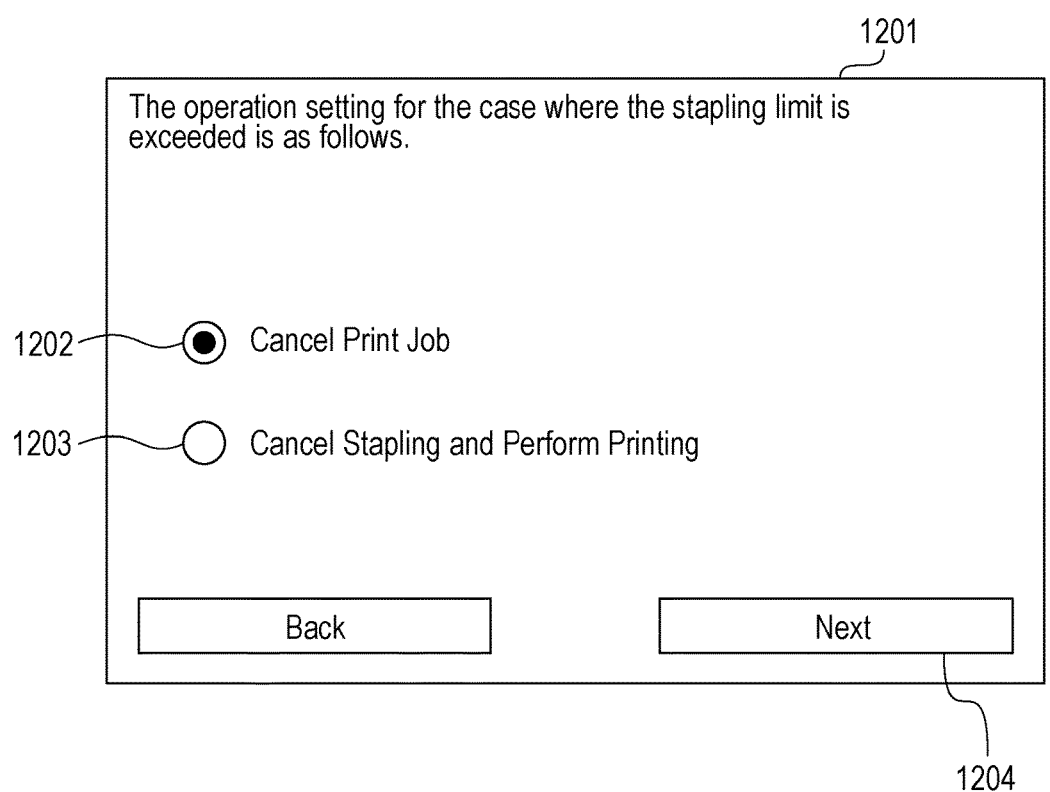
FIG. 12 illustrates a screen on which printing operations for the case where post-processing cannot be performed are displayed and changed.

In S1106, the CPU 116 extracts a screen 1201 illustrated in FIG. 12 from the RAM 117 and causes the operation unit 123 to display it. The screen 1201 is a screen on which printing operations for the case where stapling processing cannot be performed because the number of sheets of printing paper exceeds its limit are displayed and changed. When the CPU 116 displays the screen 1201, the CPU 116 accesses the table 401 stored in the RAM 117 and extracts a printing operation for the case where stapling processing, which is a selected post-processing, cannot be performed to check a radio button 1202 or 1203. After the CPU 116 displays the screen 1201, the CPU 116 causes the process to proceed to S1107.

When the user operates the operation unit 123 to select the radio button 1202 or 1203 and press a Next button 1204, the CPU 116 writes a selected printing operation setting for the case where the post-processing is disabled into a printing operation for the case where the post-processing is disabled in the table 401 in S1107. Then, the CPU 116 causes the operation unit 123 to display the screen 1001 and causes the process to proceed to S1103.

In S1108, when the user presses a copy start button, the CPU 116 causes the process to proceed to S1109. In S1109, the CPU 116 accesses the RAM 117 to record the set print settings. Then, the CPU 116 causes the process to proceed to S1110. In S1110, the CPU 116 performs printing in accordance with the determination process in S903 described in the first embodiment. Subsequently, the CPU 116 ends the process represented by the flowchart illustrated in FIG. 11.

Other Embodiments

In aspects of the present invention, a program that implements one or more functions in the above-described embodiments is supplied to a system or apparatus via a network or a storage medium. Then, aspects of the present invention can also be implemented by causing one or more processors of a computer in the system or apparatus to read and execute the program. Furthermore, aspects of the present invention can also be implemented by a circuit (an application specific integrated circuit (ASIC), for example) that implements one or more functions.

Although the exemplary embodiments of the present invention are described in detail above, aspects of the present invention are not limited to the described specific embodiments.

According to the processes in the above-described embodiments, as for a print job input to an image processing apparatus, when a limit is exceeded in post-processing, such as stapling processing, a user's intended printing operation can be performed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-165057, filed Aug. 24, 2015, which is hereby incorporated by reference herein in its entirety.

What is claimed is:

1. An image processing apparatus that executes a print job in which it is instructed to execute post-processing on a sheet on which an image has been printed, comprising:
an operation interface configured to accept an operation from a user; and
one or more processors configured to perform processing, including
setting in advance, on a basis of first information inputted via the operation interface, a first setting regarding a control that is to be performed if the post-processing instructed in the print job is not executable,
receiving a print job in which post-processing is instructed,
controlling, in a case where a second setting regarding a control that is to be performed if the instructed post-processing is not executable is specified in the received print job and where the instructed post-processing is actually not executable, execution of the print job such that priority is given to the second setting over the first setting, the second setting being set independently of inputting of the first information, and
controlling, in a case where the second setting is not specified in the received print job and where the instructed post-processing is actually not executable, execution of the print job on a basis of the first setting.

2. The image processing apparatus according to claim 1, wherein the one or more processors do not apply the second setting specified in a received first print job to print jobs other than the first print job.

3. The image processing apparatus according to claim 1, wherein, for all print jobs in which the second setting is not specified, the one or more processors control execution of the print jobs on a basis of the first setting.

4. The image processing apparatus according to claim 1, wherein the first setting is setting for instructing whether execution of the print job be cancelled or printing be executed without executing the post-processing.

5. The image processing apparatus according to claim 4, wherein the second setting is setting for instructing whether execution of the print job be cancelled or printing be executed without executing the post-processing.

6. The image processing apparatus according to claim 1, wherein a state in which the second setting is not specified in the print job includes a state in which it is instructed, in the print job, to follow the first setting if the post-processing instructed in the print job is not executable.

7. The image processing apparatus according to claim 1, wherein the post-processing is processing of stapling sheets together, and
wherein a state in which the instructed post-processing is not executable is a state in which number of the sheets is greater than predetermined number of sheets.

8. A control method of an image processing apparatus that executes a print job in which it is instructed to execute post-processing on a sheet on which an image has been printed, the image processing apparatus including an operation interface configured to accept an operation from a user, the method comprising:
setting in advance, on a basis of first information inputted via the operation interface, a first setting regarding a control that is to be performed if the post-processing instructed in the print job is not executable;
receiving a print job in which post-processing is instructed;
controlling, in a case where a second setting regarding a control that is to be performed if the instructed post-processing is not executable is specified in the received print job and where the instructed post-processing is actually not executable, execution of the print job such that priority is given to the second setting over the first setting, the second setting being set independently of inputting of the first information; and
controlling, in a case where the second setting is not executable is not specified in the received print job and where the instructed post-processing is actually not executable, execution of the print job on a basis of the first setting.

9. A non-transitory computer readable storage medium storing computer executable instructions for causing a computer to execute a control method of an image processing apparatus that executes a print job in which it is instructed to execute post-processing on a sheet on which an image has been printed, the image processing apparatus including an operation interface configured to accept an operation from a user, the control method comprising:
setting in advance, on a basis of first information inputted via the operation interface, a first setting regarding a control that is to be performed if the post-processing instructed in the print job is not executable;
receiving a print job in which post-processing is instructed;
controlling, in a case where a second setting regarding a control that is to be performed if the instructed post-processing is not executable is specified in the received print job and where the instructed post-processing is actually not executable, execution of the print job such that priority is given to the second setting over the first setting, the second setting being set independently of inputting of the first information; and controlling, in a case where the second setting is not specified in the received print job and where the instructed post-processing is actually not executable, execution of the print job on a basis of the first setting.

* * * * *